United States Patent
Umeda

(10) Patent No.: US 10,006,388 B2
(45) Date of Patent: Jun. 26, 2018

(54) ENGINE CONTROL APPARATUS AND METHOD

(71) Applicant: FUJITSU LIMITED, Kawasaki-shi, Kanagawa (JP)

(72) Inventor: Yuhei Umeda, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 700 days.

(21) Appl. No.: 14/506,310

(22) Filed: Oct. 3, 2014

(65) Prior Publication Data

US 2015/0128585 A1 May 14, 2015

(30) Foreign Application Priority Data

Nov. 11, 2013 (JP) ................................. 2013-233079

(51) Int. Cl.
*F02D 23/00* (2006.01)
*F02D 41/00* (2006.01)
*F02D 41/14* (2006.01)
*F02D 41/18* (2006.01)

(52) U.S. Cl.
CPC ..... *F02D 41/0077* (2013.01); *F02D 41/0007* (2013.01); *F02D 41/0052* (2013.01);
(Continued)

(58) Field of Classification Search
CPC .. F02D 41/0077; F02D 41/1401; F02D 41/18; F02D 41/0052; F02D 41/0007;
(Continued)

(56) References Cited

U.S. PATENT DOCUMENTS

| 8,560,206 B2* | 10/2013 | Ejiri ................... F02D 41/0007 60/605.2 |
| 2011/0029220 A1* | 2/2011 | Sasaki .................... F02B 37/24 701/106 |

(Continued)

FOREIGN PATENT DOCUMENTS

| JP | 2002-39350 A | 2/2002 |
| JP | 2006-16975 A | 1/2006 |

(Continued)

OTHER PUBLICATIONS

Extended European Search Report dated May 27, 2015 for corresponding European Patent Application No. 14188088.0, 7 pages.

(Continued)

*Primary Examiner* — Ngoc T Nguyen
(74) *Attorney, Agent, or Firm* — Fujitsu Patent Center

(57) ABSTRACT

An engine control apparatus controls an engine, by generating first and second instruction values to adjust an MAF of fresh air supplied to the engine and an MAP indicating a pressure of air supplied to the engine to respective target values, based on measured values of a first sensor which detects the MAF and a second sensor which detects the MAP, regardless of limiting conditions related to a totally closed or fully open state of an EGR and an VNT, switching a supplying destination of the measured values of the first and second sensors for a certain time after the generated first or second instruction value saturates, and generating the first and second instruction values to adjust the MAF and the MAP to the respective target values, based on the measured values of the first and second sensors, under the limiting conditions, when the switching occurs.

20 Claims, 6 Drawing Sheets

(52) U.S. Cl.
CPC ......... *F02D 41/1401* (2013.01); *F02D 41/18* (2013.01); *F02D 2041/1418* (2013.01); *F02D 2200/0406* (2013.01); *F02D 2200/0614* (2013.01); *F02D 2200/101* (2013.01); *Y02T 10/144* (2013.01); *Y02T 10/47* (2013.01)

(58) Field of Classification Search
CPC ..... F02D 2041/1418; F02D 2200/0406; F02D 2200/101; F02D 2200/0614; Y02T 10/144; Y02T 10/47
USPC .......................................................... 60/602
See application file for complete search history.

(56) References Cited

U.S. PATENT DOCUMENTS

2011/0077837 A1* 3/2011 Ejiri ................... F02D 41/0007
701/102

2012/0265425 A1* 10/2012 Maruyama .......... F02D 41/0002
701/104

FOREIGN PATENT DOCUMENTS

| JP | 2006016975 A | * | 1/2006 |
| JP | 2008-157084 A | | 7/2008 |
| JP | 2009-250187 A | | 10/2009 |
| JP | 2012-012968 | | 1/2012 |
| JP | 2012012968 A | * | 1/2012 |
| JP | 2012-167577 | | 9/2012 |
| WO | 2011/077504 | | 6/2011 |

OTHER PUBLICATIONS

Japanese Office Action dated Aug. 1, 2017 for corresponding Japanese Patent Application No. 2013-233079, with English Translation, 9 pages.

* cited by examiner

FIG.7

| | COMPUTING TIME (ms) | EVALUATION |
|---|---|---|
| COMPARISON EXAMPLE Cmp1 | 0.28 | ○ |
| COMPARISON EXAMPLE Cmp2 | 0.3 | ○ |
| COMPARISON EXAMPLE Cmp3 | 6.1 | × |
| PRACTICAL EXAMPLE Emb1 | 0.3 | ○ |

FIG.8

| | MAF RESPONSE PERFORMANCE | MAP RESPONSE PERFORMANCE | EVALUATION |
|---|---|---|---|
| COMPARISON EXAMPLE Cmp1 | △ | △ | ○ |
| COMPARISON EXAMPLE Cmp2 | ○ | △ | ○ |
| COMPARISON EXAMPLE Cmp3 | ○ | ○ | × |
| PRACTICAL EXAMPLE Emb1 | ○ | ○ | ○ |

ENGINE CONTROL APPARATUS AND METHOD

CROSS-REFERENCE TO RELATED APPLICATIONS

This application is based upon and claims the benefit of priority of the prior Japanese Patent Application No. 2013-233079, filed on Nov. 11, 2013, the entire contents of which are incorporated herein by reference.

FIELD

The embodiments discussed herein are related to an engine control apparatus, an engine control method, and a computer-readable storage medium.

BACKGROUND

Due to strict exhaust emission regulations, there are demands to reduce nitrogen oxide (NOx) emissions and PM (Particular Matter) emissions from diesel engines. One method of reducing the NOx and PM emissions adjusts an MAF (Mass Air Flow) of fresh air supplied to the engine, and an MAP (Manifold Absolute Pressure) indicating a pressure of air supplied to the engine, to respective target values. The MAF and the MAP may respectively be detected by an MAF sensor and an MAP sensor provided on the diesel engine. The MAF and the MAP may be controlled to the respective target values by controlling an EGR (Exhaust Gas Recirculator) that adjusts the amount of exhaust recirculated to the engine and a VNT (Variable Nozzle Turbo) that adjusts the amount of exhaust output to the outside of the engine. Accordingly, the Nox and PM emissions can be adjusted by controlling the EGR and the VNT, in order to adjust the oxygen concentration, the temperature, and the pressure of the air supplied to the engine.

However, a computing power or capability of an ECU (Engine Control Unit) that controls the diesel engine is relatively low in general, due to cost restrictions or the like, and the ECU is unsuited for control that requires a long computing time.

In one example of the conventional engine control method, effects of the EGR on the MAF are assumed to be dominant, and effects of the VNT on the MAP are assumed to be dominant. For this reason, a 1-input 1-output PID (Proportional Integral Derivative) control is performed to independently control the MAF by the EGR and the MAP by the VNT. According to this example of the conventional engine control method, a response deterioration occurs due to interference between the MAF and the MAP, however, the control using the ECU is possible because of the off-line design.

However, in actual practice, the effects of the EGR on the MAF are not dominant, and effects of the VNT on the MAP are not dominant. In other words, the MAF is affected by each of the EGR and the VNT, and the MAP is affected by each of the VNT and the EGR. Hence, a first method which suppresses the interference between the MAF and the MAP, by forming a 2-input 2-output ILQ (Inverse Linear Quadratic) controller, has been proposed in Japanese Laid-Open Patent Publication No. 2012-012968, for example. In a state in which a nozzle of the VNT is totally closed or fully opened, however, the response deterioration occurs. For this reason, in the state in which the nozzle of the VNT is totally closed or fully opened, the control is switched to a 1-input 1-output control of the EGR and MAF. According to this first method, the response of the MAF is improved compared to the conventional engine control method, and the MAP is comparable to that obtained by the conventional engine control method. In addition, this first method can perform the control using the ECU due to its off-line design.

On the other hand, a second method which suppresses the interference between the MAF and the MAP, by forming a 2-input 2-output model predicting controller that takes into consideration states in which a valve of the EGR or the nozzle of the VNT is totally closed and fully open, has been proposed in Japanese Laid-Open Patent Publication No. 2012-167577, for example. According to this second method, the response of the MAF and the response of the MAP are improved compared to the conventional engine control method. However, this second method is unsuited for the control using the ECU due to its on-line design and an extremely long computing time that is required.

Hence, according to the conventional engine control method, it is difficult to improve the response of the MAF and the response of the MAP by forming a controller that takes into consideration the limiting conditions or constraints related to the totally closed state and the fully open state of the valve of the EGR and the nozzle of the VNT by off-line design.

SUMMARY

Accordingly, it is an object in one aspect of the embodiment to provide an engine control apparatus, an engine control method, and a computer-readable storage medium, which can improve the response of the MAF and the response of the MAP by forming a controller that takes into consideration the limiting conditions or constraints related to the totally closed state and the fully open state of the valve of the EGR and the nozzle of the VNT by off-line design.

According to one aspect of the present invention, an engine control apparatus to control an engine, may include a first controller configured to generate first and second instruction values to adjust an MAF (Mass Air Flow) of fresh air supplied to the engine and an MAP (Manifold Absolute Pressure) indicating a pressure of air supplied to the engine to respective target values, based on measured values of a first sensor which detects the MAF and a second sensor which detects the MAP, regardless of limiting conditions related to a totally closed state or a fully open state of an EGR (Exhaust Gas Recirculator) which adjusts an amount of exhaust recirculated to the engine and a VNT (Variable Nozzle Turbo) which adjusts an amount of exhaust output to an outside of the engine; a second controller configured to generate the first and second instruction values to adjust the MAF and the MAP to the respective target values, based on the measured values of the first and second sensors, under the limiting conditions; a saturation detector configured to issue a switch instruction instructing switching of control from the first controller to the second controller when the saturation detector detects saturation of the first or second instruction value generated by the first controller; and a switch configured to supply the measured values of the first and second sensors to the first controller when no switch instruction is received, and to switch a supplying destination of the measured values of the first and second sensors from the first controller to the second controller for a certain time after receiving the switch instruction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram for explaining an example of evaluation results of computing times of the ECU; and FIG. 8 is a diagram for explaining an example of evaluation results of engine control methods.

DESCRIPTION OF EMBODIMENTS

Preferred embodiments of the present invention will be described with reference to the accompanying drawings.

When an EGR or a VNT of an engine is in a totally closed state or a fully open state, one embodiment may utilize a feature that it is possible to bring out the performance of the engine in most cases by continuing the totally closed state or the fully open state of the EGR or the VNT. More particularly, a first controller that is used may be formed by a 2-input 2-output controller which uses LQ control or the like and off-line design, regardless of limiting conditions or constraints, that is, by not taking into consideration the totally closed state or the fully open state of the EGR or the VNT. In addition, a second controller that is used may be formed by a 1-input 2-output controller which uses the LQ control or the like and the off-line design, under the limiting conditions or constraints described above where the EGR or the VNT is in the totally closed state or the fully open state. When the first controller is used and the first controller outputs an instruction to control the EGR or the VNT to the totally closed state or the fully open state, the control is switched to the second controller under the assumption that for a certain time thereafter, the EGR or the VNT remain in the totally closed state or the fully open state. As a result, it is possible to configure, by off-line design, a controller that takes into consideration the limiting conditions or constraints where the EGR or the VNT is totally closed or fully open. In other words, for the certain time after the control is switched from the first controller to the second controller, the second controller assumes that an instruction value indicating a manipulated variable for the opening of the EGR or for the VNT is constant.

A description will now be given of an engine control apparatus, an engine control method, and a computer-readable storage medium in each embodiment according to the present invention.

Figure 1:
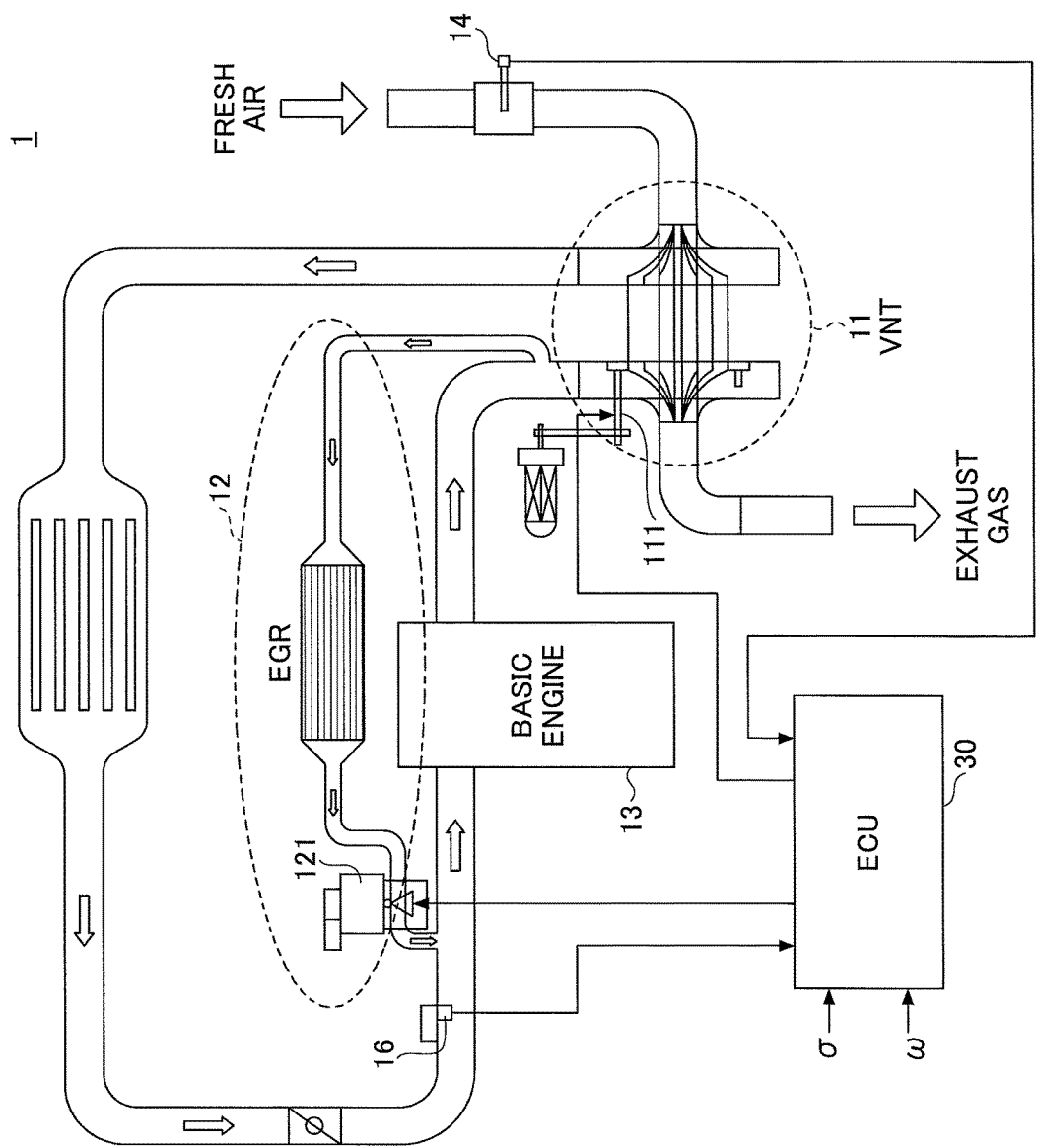
FIG. 1 is a diagram schematically illustrating a part of a diesel engine in one embodiment.

FIG. 1 is a diagram schematically illustrating a part of a diesel engine in one embodiment. In FIG. 1, outline arrows indicate directions in which air and exhaust flow.

In FIG. 1, an induction manifold control system of a diesel engine 1 includes an MAP (Manifold Absolute Pressure) control system that controls an MAP indicating a pressure of air supplied to the diesel engine 1, and an MAF (Mass Air Flow) control system that controls an MAF of fresh air supplied to the diesel engine 1. The MAP control system controls a nozzle diameter of a VNT (Variable Nozzle Turbo) nozzle 111 of a VNT 11 and controls the MAP to follow an MAP target value, in order to reduce PM (Particulate Matter) within the exhaust. On the other hand, the MAF control system controls a valve opening of an EGR (Exhaust Gas Recirculator) valve 121 of an EGR 12 that recirculates the exhaust into a cylinder of a basic engine 13 and controls the MAF to follow an MAF target value, in order to reduce NOx within the exhaust.

In other words, the EGR 12 that supplies the exhaust gas from the basic engine 13, and the VNT 11 that rotates a turbine by the pressure of the exhaust gas and compresses the fresh air to be supplied to the basic engine 13, are connected to the basic engine 13. By adjusting the valve opening of the EGR valve 121 that is provided in the EGR 12, it is possible to adjust the MAF detected by an MAF sensor 14. On the other hand, by adjusting the nozzle diameter (or nozzle opening) of the VNT nozzle 111 that is provided in the VNT 11, it is possible to adjust the rotation of the turbine of the VNT 11, and adjust the MAP detected by an MAP sensor 16.

A measured MAF value (hereinafter also referred to as an "MAF sensor value") from the MAF sensor 14, a measured MAP value (hereinafter also referred to as an "MAP sensor value") from the MAP sensor 16, a set value of a fuel injection quantity σ that input from the outside, and a set value of an engine rotational speed (or rpm, for example) ω that is input from the outside, are input to an ECU (Engine Control Unit) 30. The fuel injection quantity σ and the engine rotational speed ω are examples of operating conditions of the diesel engine 1. Based on the fuel injection quantity σ and the engine rotational speed ω that are input from the outside, the ECU 30 generates a target value for the MAF (hereinafter also referred to as a "target MAF value") and a target value for the MAP (hereinafter also referred to as a "target MAP value"). In addition, the ECU 30 supplies to the EGR valve 121 an EGR instruction value indicating a manipulated variable for the valve opening of the EGR valve 121, and the ECU 30 supplies to the VNT nozzle 111 a VNT instruction value indicating a manipulated variable for the nozzle diameter (or nozzle opening) of the VNT nozzle 111.

Figure 2:
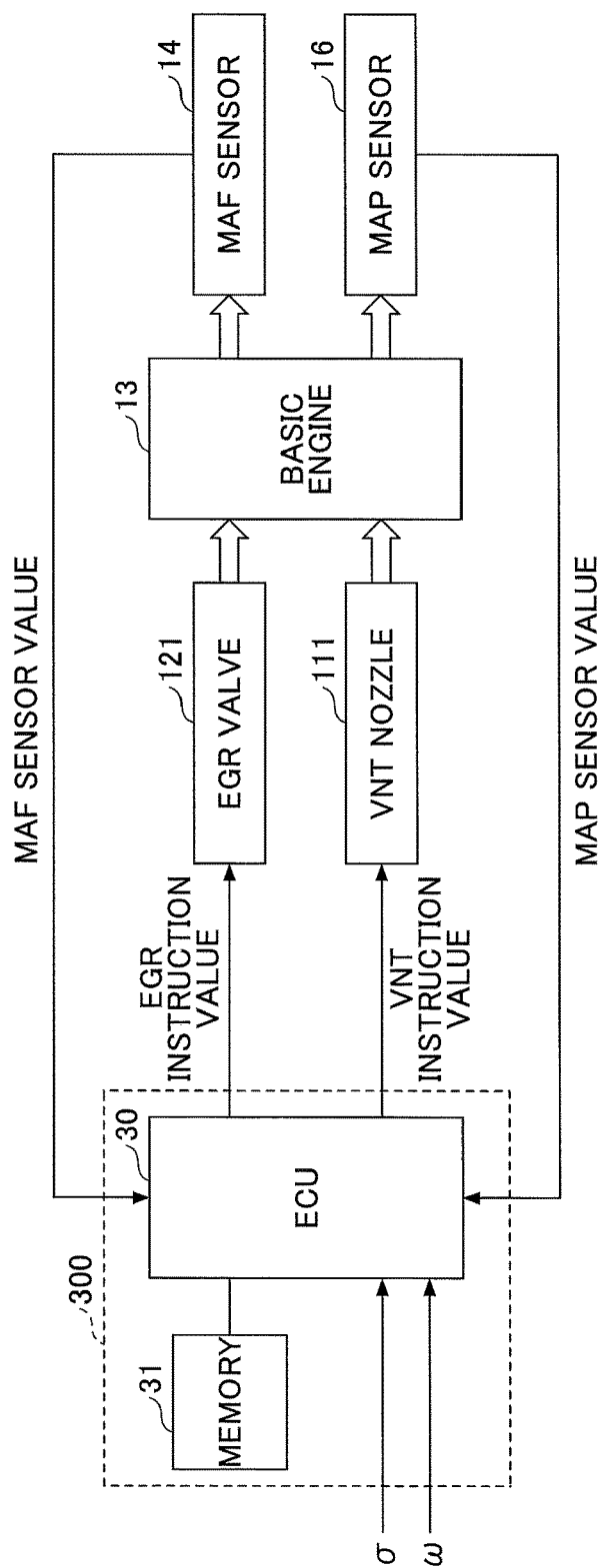
FIG. 2 is a block diagram illustrating a configuration of a part of an induction manifold control system.

FIG. 2 is a block diagram illustrating a configuration of a part of an induction manifold control system. In FIG. 2, those parts that are the same as those corresponding parts in FIG. 1 are designated by the same reference numerals, and a description thereof will be omitted.

In FIG. 2, an engine control apparatus 300 includes the ECU 30 and a memory 31. The ECU 30 is an example of a computer, a processor, a processing unit, or the like which executes functions of the engine control apparatus 300. The memory 31 is an example of a storage unit or storage means which stores one or more programs executed by the ECU 30, intermediate results of the programs and computations executed by the ECU 30, various parameters, or the like. The memory 31 may form an example of a non-transitory computer-readable storage medium which stores a program which, when executed by the ECU 30, causes the ECU 30 to perform an engine control process. The computer-readable storage medium may be formed by a portable recording medium such as a CD-ROM (Compact Disk-Read Only Memory), a DVD (Digital Versatile Disk), USB (Universal Serial Bus) memory or the like, a semiconductor memory such as a flash memory or the like, and a storage unit such as an HDD (Hard Disk Drive) or the like.

The MAF sensor value detected by the MAF sensor 14 and the MAP sensor value detected by the MAP sensor 16 are supplied to the ECU 30. The ECU 30 generates the VNT instruction value and the EGR instruction value, based on the MAF sensor value, the MAP sensor value, the set value of the fuel injection quantity σ, and the set value of the engine rotational speed ω. More particularly, the ECU 30 generates the MAF target value and the MAP target value based on the set value of the fuel injection quantity σ and the set value of the engine rotational speed ω, and generates the VNT instruction value and the EGR instruction value based on the MAF sensor value, the MAP sensor value, the MAF target value, and the MAP target value. The VNT instruction value is supplied to the VNT nozzle 111 of the VNT 11 to control the nozzle diameter (or nozzle opening) of the VNT nozzle 111, and the EGR instruction value is supplied to the EGR valve 121 of the EGR 12 to control the valve opening of the EGR valve 11. The MAF sensor 14 is provided on an MAF control side of the MAF control system with respect to the basic engine 13, together with the VNT 11, as illustrated in FIG. 1. In addition, the MAP sensor 16 is provided on an MAP control side of the MAP control system with respect to the basic engine 13, together with the EGR 12, as illustrated in FIG. 1.

Figure 3:
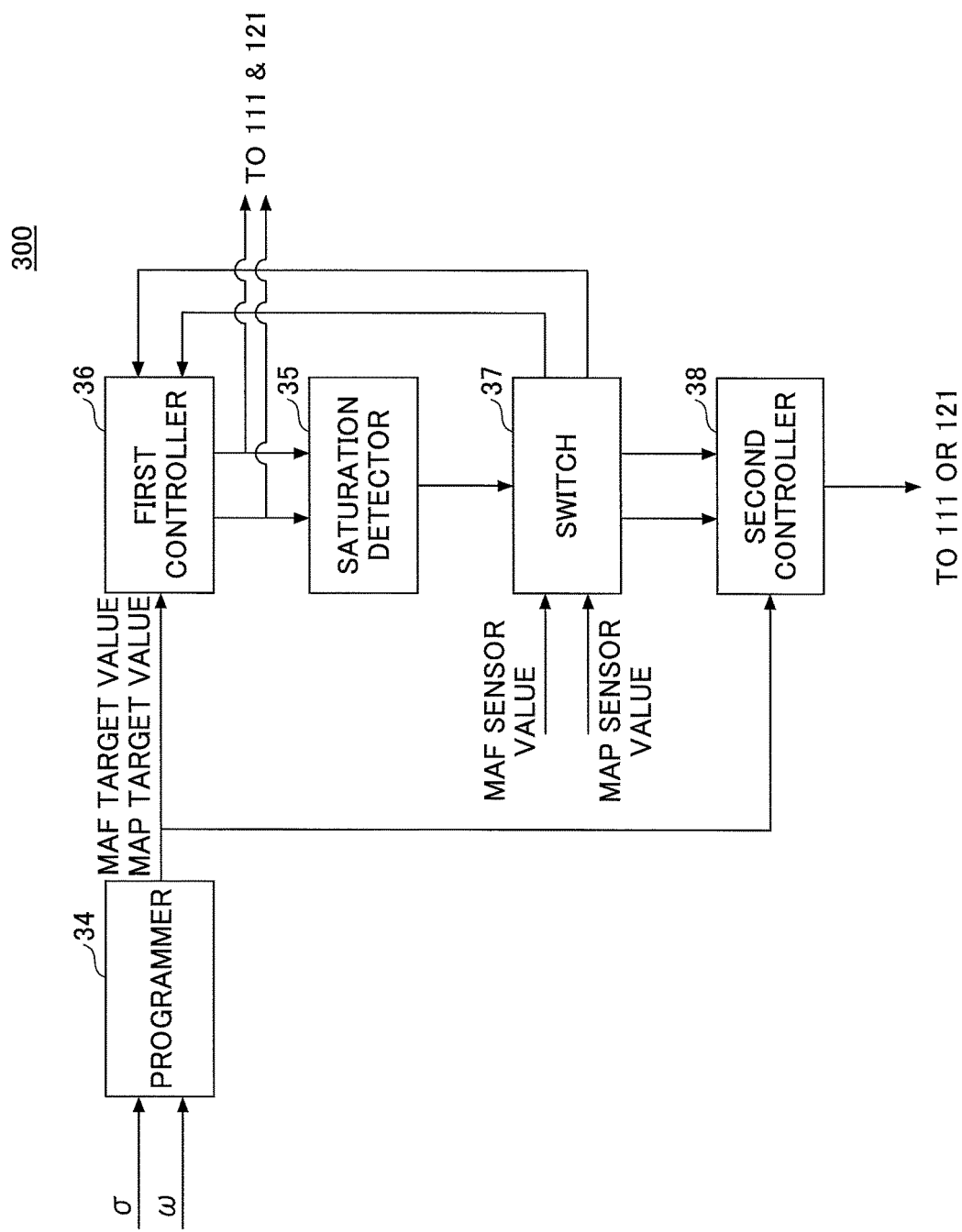
FIG. 3 is a block diagram illustrating an example of a configuration of an engine control apparatus.

FIG. 3 is a block diagram illustrating an example of a configuration of the engine control apparatus 300. In FIG. 3, the engine control apparatus 300 includes a programmer 34, a saturation detector 35, a first controller 36, a switch 37, and a second controller 38. The programmer 34 generates the MAF target value and the MAP target value according to a known method, for example, based on the set value of the fuel injection quantity σ and the set value of the engine rotational speed ω, Functions of the programmer 34, the saturation detector 35, the first controller 36, the switch 37, and the second controller 38 may be achieved by executing the program stored in the memory 31 by the ECU 30 illustrated in FIG. 2, for example, in order to perform the engine control process. The first controller 36 may be formed by a 2-input 2-output controller which uses LQ (Linear Quadratic) control or the like and off-line design, regardless of limiting conditions or constraints, that is, by not taking into consideration the totally closed state or the fully open state of the EGR valve 121 or the VNT nozzle 111. On the other hand, the second controller 38 may be formed by a 1-input 2-output controller which uses the LQ control or the like and the off-line design, under the limiting conditions or constraints described above, that is, under an assumption that the EGR valve 121 or the VNT nozzle 111 is in the totally closed state or the fully open state.

When the EGR 12 or the VNT 11 is in the totally closed state or the fully open state in the diesel engine 1, this embodiment utilizes a feature that it is possible to bring out the performance of the diesel engine 1 in most cases by continuing the totally closed state or the fully open state of the EGR 12 or the VNT 11. More particularly, the first controller 36 that is used is formed by the 2-input 2-output controller which uses LQ control or the like and off-line design, regardless of limiting conditions or constraints, that is, by not taking into consideration the totally closed state or the fully open state of the EGR valve 121 or the VNT nozzle 111. In addition, the second controller 38 that is used is formed by the 1-input 2-output controller which uses the LQ control or the like and the off-line design, under the limiting conditions or constraints described above where the EGR valve 121 or the VNT nozzle 111 is in the totally closed state or the fully open state. When the first controller 36 is used and the first controller outputs an instruction to control the EGR valve 121 or the VNT nozzle 111 to the totally closed state or the fully open state, the control is switched to the second controller 38 under the assumption that for a certain time thereafter, the EGR valve 121 or the VNT nozzle 111 remain in the totally closed state or the fully open state. As a result, it is possible to configure, by off-line design, a controller that takes into consideration the limiting conditions or constraints where the EGR valve 121 or the VNT nozzle 111 is totally closed or fully open. In other words, for the certain time after the control is switched from the first controller 36 to the second controller 38, the second controller 38 assumes that the instruction value indicating the manipulated variable for the valve opening of the EGR valve 121 or indicating the manipulated variable for the nozzle diameter (or nozzle opening) of the VNT nozzle 111 is constant (that is, remains the same).

When the EGR instruction value or the VNT instruction value generated by the first controller 36 based on the MAF sensor value, the MAP sensor value, the MAF target value, and the MAP target value saturates, the saturation detector 35 issues a switch instruction which instructs the switching of control from the first controller 36 to the second controller 38, and supplies the switch instruction to the switch 37. The switch 37 supplies the MAF sensor value and the MAP sensor value to the first controller 36 when no switch instruction is received from the saturation detector 35. On the other hand, when the switch 37 receives the switch instruction from the saturation detector 35, the switch 37 switches a supplying destination of the MAF sensor value and the MAP sensor value for a certain time in response to the switch instruction, and the MAF sensor value and the MAP sensor value are supplied to the second controller 38 for this certain time. Accordingly, when the EGR instruction value saturates, the second controller 38 generates the VNT instruction value which assumes that the EGR instruction value is saturated, and outputs this VNT instruction value to the VNT nozzle 111 to control the nozzle diameter (or nozzle opening) thereof to the manipulated variable indicated by this VNT instruction value. In addition, when the VNT instruction value saturates, the second controller 38 generates the EGR instruction value which assumes that the VNT instruction value is saturated, and outputs this EGR instruction value to the EGR valve 121 to control the valve opening thereof to the manipulated variable indicated by this EGR instruction value.

Alternatively, when the generated EGR instruction value or VNT instruction value is saturated, the saturation detector 35 may issue the switch instruction which instructs switching of the control from the first controller 36 to the second controller 38 for a certain time from the time when the saturation is detected, and supply this switch instruction to the switch 37. In this case, while the switch 37 receives the switch instruction, the switch 37 may switch the supplying destination of the MAF sensor value and the MAP sensor value, and supply the MAF sensor value and the MAP sensor value to the second controller 38.

In addition, the certain time after the EGR instruction value or the VNT instruction value saturates may be set appropriately depending on characteristics or the like of the diesel engine 1, for example.

On the other hand, when the saturation detector 35 detects that the EGR instruction value and the VNT instruction value generated by the first controller 36 are not saturated, the saturation detector 35 does not issue the switch instruction which instructs switching of the control from the first controller 36 to the second controller 38, and thus, the first controller 36 outputs the EGR instruction value and the VNT instruction value generated thereby. In this case, the valve opening of the EGR valve 121 is controlled to the manipulated variable indicated by the EGR instruction value output from the first controller 36, and the nozzle diameter (or nozzle opening) of the VNT nozzle 111 is controlled to the manipulated variable indicated by the VNT instruction value output from the first controller 36.

The functions of the programmer 34, the saturation detector 35, the first controller 36, the switch 37, and the second controller 38 may be performed by hardware.

Figure 4:
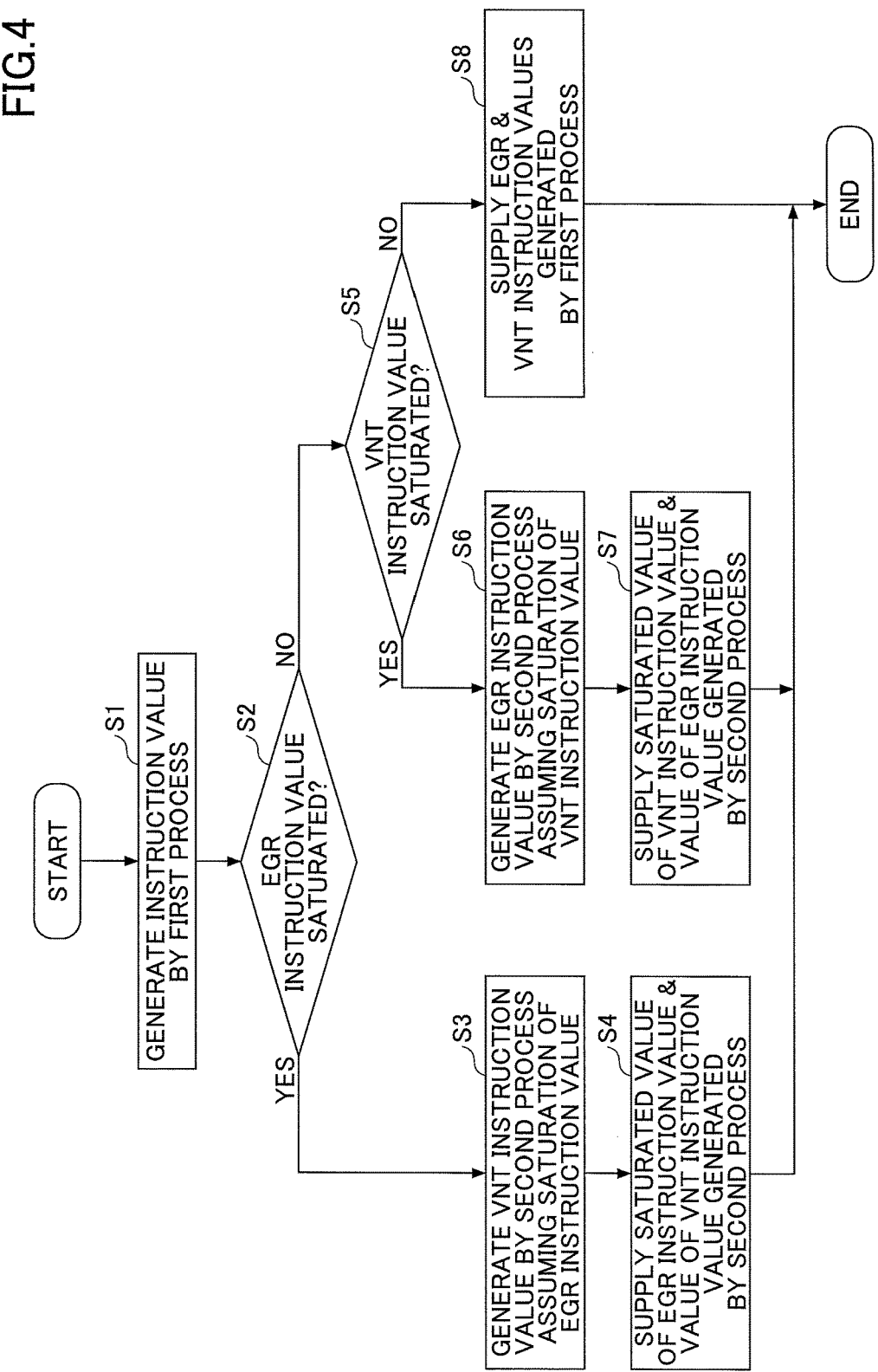
FIG. 4 is a flow chart for explaining an example of an operation of the engine control apparatus.

FIG. 4 is a flow chart for explaining an example of an operation of the engine control apparatus 300. An engine control process illustrated in FIG. 4 may be executed by the ECU 30, for example. This engine control process may be executed every time the value of at least one of the MAF sensor value, the MAP sensor value, the MAF target value, and the MAP target value changes.

In FIG. 4, the ECU 30 in step S1 executes a first process of the first controller 36, based on the MAF sensor value, the MAP sensor value, the MAF target value, and the MAP target value, and generates the EGR instruction value and the VNT instruction value. The ECU 30 in step S2 judges whether the EGR instruction value generated by the first process is saturated. The control is switched to the second controller 38 when the judgment result in step S2 is YES, and the process advances to step S3. On the other hand, the process advances to step S5 when the judgment result in step S2 is NO.

The ECU 30 in step S3 executes a second process of the second controller 38, based on the MAP sensor value and the MAP target value, and generates the VNT instruction value which assumes that the EGR instruction value is saturated. The ECU 30 in step S4 supplies the EGR instruction value, assumed to be saturated, to the EGR valve 121 of the EGR 12, supplies the VNT instruction value generated by the second process to the VNT nozzle 111 of the VNT 11, and the process ends after a certain time elapses from the time when the EGR instruction value is judged in step S2 as being saturated.

The ECU 30 in step S5 judges whether the VNT instruction value generated by the first process is saturated. The control is switched to the second controller 38 when the judgment result in step S5 is YES, and the process advances to step S6. On the other hand, the process advances to step S8 when the judgment result in step S5 is NO.

The ECU 30 in step S6 executes the second process of the second controller 38, based on the MAF sensor value and the MAF target value, and generates the EGR instruction value which assumes that the VNT instruction value is saturated. The ECU 30 in step S7 supplies the VNT instruction value, assumed to be saturated, to the VNT nozzle 111 of the VNT 11, supplies the EGR instruction value generated by the second process to the EGR valve 121 of the EGR 12, and the process ends after a certain time elapses from the time when the VNT instruction value is judged in step S5 as being saturated.

On the other hand, the ECU 30 in step S8 supplies the EGR instruction value generated by the first process of the first controller 36 to the EGR valve 121 of the EGR 12, supplies the VNT instruction value generated by the first process of the first controller 36 to the VNT nozzle 111 of the VNT 11, and the process ends.

Next, a description will be given of an example of the first controller 36. In this example, the first controller 36 is formed by an LQ controller which is an example of an MIMO (Multi-Input Multi-Output) controller. An output of this LQ controller is a solution to an optimization problem to minimize J(k) represented by the following equation, and both the EGR instruction value and the VNT instruction value can be obtained from a first order equation of the present MAF sensor value and MAP sensor value. In the following equation, x(k) is a state vector including the MAF sensor value and the MAP sensor value, $X_{ref}$ is a target value vector including the MAF target value and the MAP target value, u(k) is a manipulated variable vector including the EGR instruction value and the VNT instruction value, Q, R and S are weights, $H_p$ and $H_c$ are intervals satisfying $H_p > H_c$, and A and B are matrices. The intervals $H_p$ and $H_c$ are set to finite intervals because the saturation of the EGR instruction value or the VNT instruction value does not continue indefinitely.

$$J(k) = \sum_{i=1}^{H_p-1} \left( ((X_{ref} - x(k+i))^T Q(X_{ref} - x(k+i))) + \sum_{i=0}^{H_c-1} (u(k+i)^T Ru(k+i)) \right) +$$

$$((X_{ref} - x(k+H_p))^T S(X_{ref} - x(k+H_p)))$$

$$\begin{cases} x(k+i+1) = Ax(k+i) + Bu(k+i), \\ x(k) = x, \end{cases}$$

Next, a description will be given of an example of the second controller 38. In this example, the second controller 38 is formed by an LQ controller which is an example of an SIMO (Single-Input Multi-Output) controller. An output of this LQ controller is a solution to an optimization problem to minimize J(k) represented by the following equation, and both the EGR instruction value and the VNT instruction value can be obtained from a first order equation of the present MAF sensor value and MAP sensor value. In other words, the optimization problem J(k) can obtain from the first order equation a solution to $u_1(0)$ having an initial value and $u_2^{min}$ as its parameters. In the following equation, x(k) is a state vector including the MAF sensor value and the MAP sensor value, $X_{ref}$ is a target value vector including the MAF target value and the MAP target value, u(k) is a manipulated variable vector including the EGR instruction value and the VNT instruction value, Q, R and S are weights, $H_p$ and $H_c$ are intervals satisfying $H_p > H_c$ and A and B are matrices. The intervals $H_p$ and $H_c$ are set to finite intervals because the saturation of the EGR instruction value or the VNT instruction value does not continue indefinitely.

$$J(k) = \sum_{i=1}^{H_p-1} \left( ((X_{ref} - x(k+i))^T Q(X_{ref} - x(k+i))) + \sum_{i=0}^{H_c-1} (u(k+i)^T Ru(k+i)) \right) +$$

$$((X_{ref} - x(k+H_p))^T S(X_{ref} - x(k+H_p)))$$

$$\begin{cases} x(k+i+1) = Ax(k+i) + Bu(k+i), \\ x(k) = x, \\ u_2(k+i) = u_2^{min} \end{cases}$$

The optimum input equation for the case in which the EGR instruction value or the VNT instruction value saturates has the same form when the EGR valve 121 or the VNT nozzle 111 is totally closed and when the EGR valve 121 or the VNT nozzle 111 is completely open. When the EGR instruction value is saturated, the second controller 38 can be represented by a first order equation of the present MAF state, the present MAP state, and the saturated value of the EGR instruction value. Similarly, when the VNT instruction value is saturated, the second controller 38 can be represented by a first order equation of the present MAF state, the present MAP state, and the saturated value of the VNT instruction value.

Figure 5:
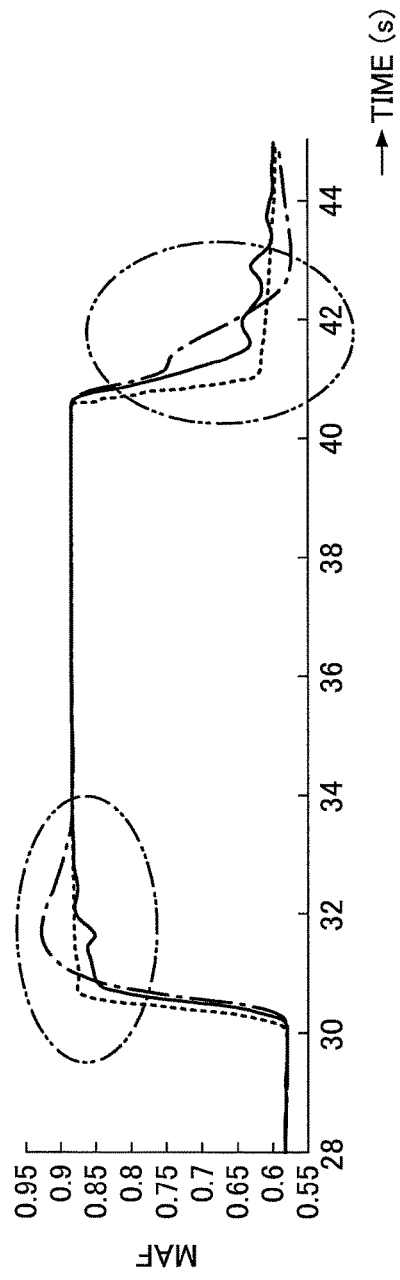
FIG. 5 is a diagram for explaining an example of a response performance of an MAF control system.

FIG. 5 is a diagram for explaining an example of a response performance of the MAF control system. In FIG. 5, the ordinate indicates the MAF sensor value in arbitrary units, and the abscissa indicates the time in seconds (s). In FIG. 5, a solid line indicates the MAF sensor value in the embodiment described above, a dotted line indicates the MAF target value, and a one-dot chain line indicates an MAF sensor value that is obtained by a comparison example which uses the first method described above and proposed in Japanese Laid-Open Patent Publication No. 2012-012968, for example. As illustrated in oval regions surrounded by two-dot chain lines in FIG. 5, an overshoot at rising edge and falling edge parts of the MAF sensor value in the embodiment described above is suppressed when compared to that of the comparison example, and it can be confirmed that the following property of the MAF control system in the embodiment described above is improved compared to that of the comparison example. In other words, according to the embodiment described above, the MAF response performance, that is, the response performance of the MAF control system, can be improved.

Figure 6:
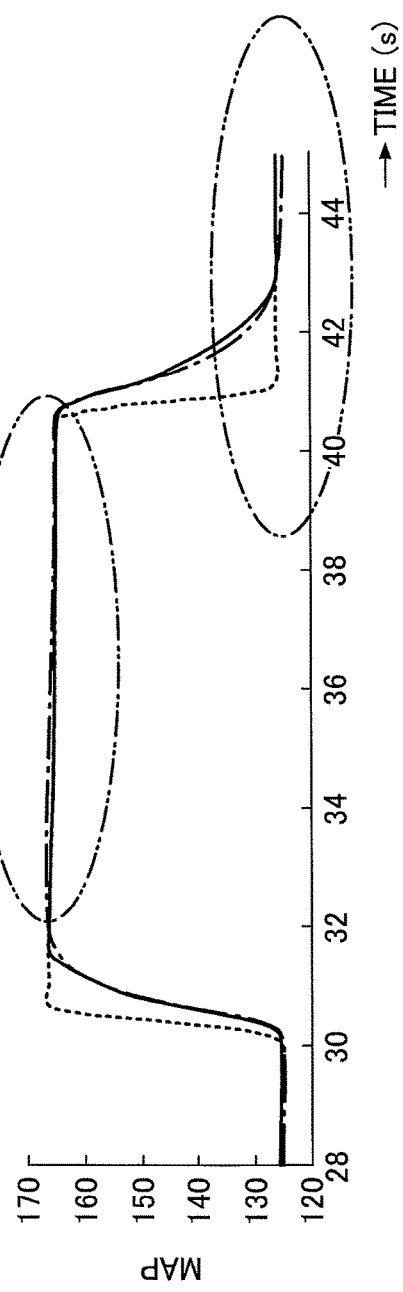
FIG. 6 is a diagram for explaining an example of a response performance of an MAP control system.

FIG. 6 is a diagram for explaining an example of a response performance of the MAP control system. In FIG. 6, the ordinate indicates the MAP sensor value in arbitrary units, and the abscissa indicates the time in seconds (s). In FIG. 6, a solid line indicates the MAP sensor value in the embodiment described above, a dotted line indicates the MAP target value, and a one-dot chain line indicates an MAP sensor value that is obtained by the comparison example which uses the first method described above and proposed in Japanese Laid-Open Patent Publication No. 2012-012968, for example. As illustrated in oval regions surrounded by two-dot chain lines in FIG. 6, a deviation at a part after a rising edge and a part after a falling edge of the MAP sensor value in the embodiment described above is suppressed when compared to that of the comparison example, and it can be confirmed that the following property of the MAP control system in the embodiment described above is improved compared to that of the comparison example. In other words, according to the embodiment described above, the MAP response performance, that is, the response performance of the MAP control system, can be improved.

FIG. 7 is a diagram for explaining an example of evaluation results of computing times of the ECU. In FIG. 7, a comparison example Cmp1 corresponds to the conventional engine control method described above, a comparison example Cmp2 corresponds to the first method described above and proposed in Japanese Laid-Open Patent Publication No. 2012-012968, for example, a comparison example Cmp3 corresponds to second method described above and proposed in Japanese Laid-Open Patent Publication No. 2012-167577, for example, and a practical example Emb1 corresponds to the embodiment described above. FIG. 7 illustrates the computing time (ms: milliseconds) and the evaluation. In FIG. 7, the computing time is measured using a computer having a computing power or capability higher than that of the ECU 30, and the evaluation indicates whether the computation suits the process to be executed by the ECU 30. An evaluation "○" indicates that the computation is inexpensive and suits the process to be executed by the ECU 30 having a relatively low computing power or capability, and an evaluation "X" indicates that the computation is unsuited for the process to be executed by the ECU 30. As illustrated in FIG. 7, the computing time of the practical example Emb1 is 0.3 ms which is relatively short, the evaluation of the practical example Emb1 is "○", and it can be confirmed that the computation suits the process to be executed by the ECU 30.

FIG. 8 is a diagram for explaining an example of evaluation results of engine control methods. In FIG. 8, the comparison example Cmp1 corresponds to the conventional engine control method described above, the comparison example Cmp2 corresponds to the first method described above and proposed in Japanese Laid-Open Patent Publication No. 2012-012968, for example, the comparison example Cmp3 corresponds to second method described above and proposed in Japanese Laid-Open Patent Publication No. 2012-167577, for example, and the practical example Emb1 corresponds to the embodiment described above. FIG. 8 illustrates the MAF response performance, the MAP response performance, and the evaluation. In FIG. 8, a response performance "○" indicates that the response performance is good, and a response performance "Δ" indicates that the response performance is deteriorated. Further, in FIG. 7, the computing time is measured using a computer having a computing power or capability higher than that of the ECU 30, and the evaluation indicates whether the computation suits the process to be executed by the ECU 30. An evaluation "○" indicates that the computation is inexpensive and suits the process to be executed by the ECU 30 having a relatively low computing power or capability, and an evaluation "X" indicates that the computation is unsuited for the process to be executed by the ECU 30. As illustrated in FIG. 8, both the MAF response performance and the MAP response performance of the practical example Emb1 are good, the computing time of the practical example Emb1 is relatively short and the evaluation of the practical example Emb1 is "○", and it can be confirmed that the computation suits the process to be executed by the ECU 30.

Therefore, according to the embodiment and the practical example Emb1 described above, it is possible to improve the MAF response performance and the MAP response performance, by forming the controller that takes into consideration the limiting conditions or constraints related to the totally closed state and the fully open state of the valve of the EGR and the nozzle of the VNT by off-line design. In addition, by improving both the MAF response performance and the MAP response performance, the Nox and PM emissions can be reduced. Moreover, the computation of the controller can be executed by an ECU having a relatively low computing power or capability, within a tolerable computing time.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An engine control method to control an engine, comprising:
generating, by a first controller, a first instruction value to adjust a MAF (Mass Air Flow) of fresh air supplied to the engine to a target value of the MAF and a second instruction value to adjust a MAP (Manifold Absolute Pressure) indicating a pressure of air supplied to the engine to a target value of the MAP, based on a measured value output from a first sensor which detects the MAF and a measured value output from a second sensor which detects the MAP, independently of limiting conditions related to a totally closed state or a fully open state of an EGR (Exhaust Gas Recirculator) which adjusts an amount of exhaust recirculated to the engine and a totally closed state or a fully open state of a VNT (Variable Nozzle Turbo) which adjusts an amount of exhaust output to an outside of the engine;
generating, by a second controller, the first instruction value to adjust the MAF to the target value of the MAF and the second instruction value to adjust the MAP to the target value of the MAP, based on the measured values output from the first and second sensors, under the limiting conditions;
detecting, by a detector, one state in which the first instruction value generated by the first controller indicates the totally closed state or the fully open state of the EGR or the second instruction value generated by the first controller indicates the totally closed state or the fully open state of the VNT, and outputting a detection signal when the one state is detected and otherwise output no detection signal; and
switching, by a switch, a supply route of the measured values output from the first and second sensors between a first route and a second route, wherein the switch selects the first route to supply the measured values output from the first and second sensors to the first controller when no detection signal is issued from the detector, and wherein the switch switches the supply route from the first route to the second route for a set time period after receiving the detection signal from the detector to supply the measured values output from the first and second sensors to the second controller for the set time period after the detection signal is issued from the detector.

2. The engine control method as claimed in claim 1, wherein
the first controller is configured independently of the limiting conditions related to a totally closed state or a fully open state of a valve of the EGR or a nozzle of the VNT by off-line design, to generate the first instruction value to adjust the MAF to the target value of the MAF based on the measured value output from the first sensor, and the second instruction value to adjust the MAP to the target value of the MAP based on the measured value output from the second sensor, and
the second controller is configured depending on the limiting conditions related to the totally closed state or the fully open state of the valve of the EGR or the nozzle of the VNT by off-line design, to generate one of the first instruction value to adjust the MAF to the target value of the MAF based on the measured value output from the first sensor and the second instruction value to adjust the MAP to the target value of the MAP based on the measured value output from the second sensor, and to generate a constant value as other of the first and second instruction values.

3. The engine control method as claimed in claim 1, further comprising:
generating, by a circuit, the target value of the MAF and the target value of the MAP, based on a set value of a fuel injection quantity and a set value of an engine rotational speed, and outputting the target values to the first and second controllers.

4. The engine control method as claimed in claim 1, wherein an ECU (Engine Control Unit), configured to control a diesel engine, executes processes of the first controller, the second controller, the detector, and the switch.

5. The engine control method as claimed in claim 1, further comprising:
generating, by the second controller, for the set time period after the switching of the control from the first controller to the second controller, a constant value as an instruction value indicating a manipulated variable for a valve of the EGR or a nozzle of the VNT.

6. The engine control method as claimed in claim 1, wherein the first controller is a MIMO (Multi-Input Multi-Output) controller having two or more variable inputs including the measured values output from the first and second sensors, and the second controller is a SIMO (Single-Input Multi-Output) controller having a single variable input of the measured value from one of the first and second sensors and a fixed constant input as the measured value from other of the first and second sensors.

7. A non-transitory computer-readable storage medium having stored therein a program for causing a computer to execute a process comprising:
first generating, using a first controller, a first instruction value to adjust a MAF (Mass Air Flow) of fresh air supplied to the engine to a target value of the MAF and a second instruction value to adjust a MAP (Manifold Absolute Pressure) indicating a pressure of air supplied to the engine to a target value of the MAP, based on a measured value output from a first sensor which detects the MAF and a measured value output from a second sensor which detects the MAP, independently of limiting conditions related to a totally closed state or a fully open state of an EGR (Exhaust Gas Recirculator) which adjusts an amount of exhaust recirculated to the engine and a totally closed state or a fully open state of an VNT (Variable Nozzle Turbo) which adjusts an amount of exhaust output to an outside of the engine;
switching a supply route of the measured values output from the first and second sensors between a first route and a second route, wherein the switch switches the supply route from the first route to a second route to a second controller for a set time period after detecting that the first or second instruction value generated by the first generating indicates the totally closed state or the fully open state of the EGR or the VNT; and
second generating, using the second controller, the first instruction value to adjust the MAF to the target value of the MAF and the second instruction value to adjust the MAP to the target value of the MAP, based on the measured values output from the first and second sensors, under the limiting conditions, when the switching occurs.

8. The non-transitory computer-readable storage medium as claimed in claim 7, wherein
the first generating uses the first controller which is configured independently of the limiting conditions related to a totally closed state or a fully open state of a valve of the EGR or a nozzle of the VNT by off-line design, to generate the first instruction value to adjust the MAF to the target value of the MAF based on the measured value output from the first sensor, and the second instruction value to adjust the MAP to the target value of the MAP based on the measured value output from the second sensor, and the second generating uses the second controller which is configured depending on the limiting conditions related to the totally closed state or the fully open state of the valve of the EGR or the nozzle of the VNT by off-line design, to generate one of the first instruction value to adjust the MAF to the target value of the MAF based on the measured value output from the first sensor and the second instruction value to adjust the MAP to the target value of the MAP based on the measured value output from the second sensor, and to generate a constant value as other of the first and second instruction values.

9. The non-transitory computer-readable storage medium as claimed in claim 7, wherein the process further comprises:

generating the target value of the MAF and the target value of the MAP, based on a set value of a fuel injection quantity and a set value of an engine rotational speed.

10. The non-transitory computer-readable storage medium as claimed in claim 7, wherein the computer is an ECU (Engine Control Unit) which controls a diesel engine.

11. The non-transitory computer-readable storage medium as claimed in claim 7, wherein the process further comprises:

generating, using the second controller, for the set time period after the switching occurs, a constant value as an instruction value indicating a manipulated variable for a valve of the EGR or a nozzle of the VNT.

12. The non-transitory computer-readable storage medium as claimed in claim 7, wherein the program causes the computer to execute the process further comprising:

issuing a switch signal that instructs switching of control from the first controller to the second controller upon detection of the first or second instruction value generated by the first controller and indicating the totally closed state or the fully open state of the EGR or the VNT; and supplying the measured values output from the first and second sensors to the first controller when no switch signal is issued, wherein the switching switches the supplying destination of the measured values output from the first and second sensors from the first controller to the second controller for the set time period after the switch signal is issued.

13. The non-transitory computer-readable storage medium as claimed in claim 7, wherein the first controller is a MIMO (Multi-Input Multi-Output) controller having two or more variable inputs including the measured values output from the first and second sensors, and the second controller is a SIMO (Single-Input Multi-Output) controller having a single variable input of the measured value from one of the first and second sensors and a fixed constant input as the measured value from other of the first and second sensors.

14. The non-transitory computer-readable storage medium as claimed in claim 7, wherein the process further comprises:

performing processes of the first controller to generate the first and second instruction values; and performing processes of the second controller to generate one of the first and second instructions values, and a fixed constant value as the other of the first and second instruction values.

15. An engine control apparatus to control an engine, comprising:

a first controller configured to generate a first instruction value to adjust a MAF (Mass Air Flow) of fresh air supplied to the engine to a target value of the MAF and a second instruction value to adjust a MAP (Manifold Absolute Pressure) indicating a pressure of air supplied to the engine to a target value of the MAP, based on a measured value output from a first sensor which detects the MAF and a measured value output from a second sensor which detects the MAP, independently of limiting conditions related to a totally closed state or a fully open state of an EGR (Exhaust Gas Recirculator) which adjusts an amount of exhaust recirculated to the engine and a totally closed state or a fully open state of a VNT (Variable Nozzle Turbo) which adjusts an amount of exhaust output to an outside of the engine;

a second controller configured to generate the first instruction value to adjust the MAF to the target value of the MAF and the second instruction value to adjust the MAP to the target value of the MAP, based on the measured values output from the first and second sensors, under the limiting conditions;

a detector configured to detect one state in which the first instruction value generated by the first controller indicates the totally closed state or the fully open state of the EGR or the second instruction value generated by the first controller indicates the totally closed state or the fully open state of the VNT, and to output a detection signal when the one state is detected and otherwise output no detection signal; and a switch configured to switch a supply route of the measured values output from the first and second sensors between a first route and a second route, wherein the switch selects the first route to supply the measured values output from the first and second sensors to the first controller when no detection signal is received from the detector, and wherein the switch switches the supply route from the first route to the second route for a set time period after receiving the detection signal from the detector to supply the measured values output from the first and second sensors to the second controller for the set time period after receiving the detection signal from the detector.

16. The engine control apparatus as claimed in claim 15, wherein the EGR includes a valve, the VNT includes a nozzle, the first controller is configured independently of the limiting conditions related to a totally closed state or a fully open state of the valve or the nozzle by off-line design, to generate the first instruction value to adjust the MAF to the target value of the MAF based on the measured value output from the first sensor, and the second instruction value to adjust the MAP to the target value of the MAP based on the measured value output from the second sensor, and the second controller is configured depending on the limiting conditions related to the totally closed state or the fully open state of the valve or the nozzle by off-line design, to generate one of the first instruction value to adjust the MAF to the target value of the MAF based on the measured value output from the first sensor and the second instruction value to adjust the MAP to the target value of the MAP based on the measured value output from the second sensor, and to generate a constant value as other of the first and second instruction values.

17. The engine control apparatus as claimed in claim 15, further comprising:
a circuit configured to generate the target value of the MAF and the target value of the MAP, based on a set value of a fuel injection quantity and a set value of an engine rotational speed, and to output the target values to the first and second controllers.

18. The engine control apparatus as claimed in claim 15, wherein the first controller, the second controller, the detector, and the switch are included in an ECU (Engine Control Unit) that is configured to control a diesel engine.

19. The engine control apparatus as claimed in claim 15, wherein the second controller is further configured to generate, for the set time period after the switching of the control from the first controller to the second controller, a constant value as an instruction value indicating a manipulated variable for a valve of the EGR or a nozzle of the VNT.

20. The engine control apparatus as claimed in claim 15, wherein the first controller is a MIMO (Multi-Input Multi-Output) controller having two or more variable inputs including the measured values output from the first and second sensors, and the second controller is a SIMO (Single-Input Multi-Output) controller having a single variable input of the measured value from one of the first and second sensors and a fixed constant input as the measured value from other of the first and second sensors.

* * * * *